United States Patent [19]

Ferreira et al.

[11] Patent Number: 5,737,164

[45] Date of Patent: Apr. 7, 1998

[54] SWITCHED RELUCTANCE MACHINE CAPABLE OF IMPROVED FAULT OPERATION

[75] Inventors: Caio Alexandre Ferreira, Rockford; James Aaron Buerosse, Cherry Valley, both of Ill.

[73] Assignee: Sundstrand Corporation, Rockford, Ill.

[21] Appl. No.: 680,305

[22] Filed: Jul. 11, 1996

[51] Int. Cl.[6] .................................................. H02H 5/04
[52] U.S. Cl. .................................. 361/31; 310/168
[58] Field of Search .......................... 361/23, 24, 31, 361/33, 93; 310/168, 162, 166, 68 B; 307/127; 318/701, 685, 696

[56] References Cited

U.S. PATENT DOCUMENTS

| | | | |
|---|---|---|---|
| 4,625,158 | 11/1986 | Taenzer | 318/701 |
| 4,707,650 | 11/1987 | Bose | 318/685 |
| 4,896,088 | 1/1990 | Jahns | 318/696 |
| 4,896,089 | 1/1990 | Kliman et al. | 318/701 |
| 5,111,095 | 5/1992 | Hendershot | 310/168 |

Primary Examiner—Jeffrey A. Gaffin
Assistant Examiner—Michael J. Sherry
Attorney, Agent, or Firm—Antonelli, Terry, Stout & Kraus

[57] ABSTRACT

A switched reluctance machine capable of improved operation under fault conditions. The machine includes a controller which responds to a fault in a phase winding by cutting off current to the phase windings of all stator poles that are aligned with a rotor pole at the time the stator pole having the phase winding with the fault therein aligned with a rotor pole. Consequently, there is no magnetic flux in the stator or rotor at such time. Therefore, no current is induced in the faulted phase winding. This avoids generation of a counter torque, as well as avoiding potential catastrophic failure of the SR machine.

4 Claims, 4 Drawing Sheets

SWITCHED RELUCTANCE MACHINE CAPABLE OF IMPROVED FAULT OPERATION

TECHNICAL FIELD

The present invention relates to switched reluctance machines. More particularly, the present invention relates to operation of a switched reluctance (SR) machine, such as a SR motor/generator, which is capable of improved operation under fault conditions, for example a short in one phase winding of the machine.

BACKGROUND ART

Switched reluctance machines are frequently utilized to provide auxiliary power in environments such as on board an aircraft. Such machines are sometimes required to operate as a generator and at other times required to operate as a motor. Switched reluctance machines typically have a rotor with a number of pairs of poles and a stator with a larger number of pairs of poles. By way of example, the rotor might have four pairs, or eight, poles, with the stator having six pairs, or twelve, poles. The stator poles have phase windings on them, while the rotor poles have no windings. Opposite ones of the stator poles form a pair and have their phase windings connected in series or in parallel. In general, the phase windings of an SR machine are essentially free of any magnetic coupling, and so current in one phase winding does not induce current in adjacent phase windings.

At a number of points during each rotation of the rotor, equal to the number of stator poles, a number of the pairs of rotor poles is aligned with an equal number of pairs of stator poles, while all of the remaining rotor poles and stator poles are unaligned. A high inductance magnetic flux path exists from an aligned stator pole, around the core of the stator, through the next adjacent aligned stator pole, across an air gap to the aligned rotor pole, around the core of the rotor, through the correspondingly aligned rotor pole, and across the adjacent air gap back to the initial stator pole. When current is flowing through the phase windings in all the aligned stator poles, a high magnetic flux is present in this path.

If a fault occurs in the phase winding of one stator pole in an SR machine, for example a ground fault or shorted windings, accepted prior art practice has been to cut off the flow of current through that phase winding and the phase winding on the radially opposite stator pole, and to continue operation with the remaining phase windings. However, in such a fault condition, when the stator pole having the faulted phase winding is aligned with a rotor pole, a magnetic flux path still exists through those aligned poles and through all other stator/rotor poles which are aligned at that same time. Since only the faulted pole and its radially opposite pole have had their current cut off, current flows through the phase windings of the other aligned stator poles. This current causes a magnetic flux in the path through the stator pole of the faulted phase winding, and the flux results in a torque which opposes the torque of the excited phase, and so reduces the machine's average output torque. The changing flux in the faulted phase winding also induces a current in that phase winding, which could lead to a catastrophic failure of the SR machine.

DISCLOSURE OF INVENTION

The present invention is an SR machine capable of improved operation under such fault conditions. In accordance with the present invention, an SR machine includes a control circuit which, when a fault exists in the phase winding of one stator pole, cuts off the current through not only the pair of phase windings made up of that faulted phase winding and its radially opposite phase winding, but also through the phase windings of all stator poles which are aligned with rotor poles at the time the stator pole having the faulted phase winding is aligned with a rotor pole. As a consequence, when the stator pole of the faulted phase winding is aligned with a rotor pole, no magnetic flux is caused to flow through the aligned poles. Therefore, no counteracting torque is generated, no current is induced in the faulted phase winding, and the potential for a catastrophic failure is minimized.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

FIG. 1 is a diagrammatic depiction of the stator and rotor of a SR machine in accordance with the present invention, and includes a schematic diagram of a portion of the circuitry of the machine;

BEST MODE FOR CARRYING OUT THE INVENTION

Figure 3:
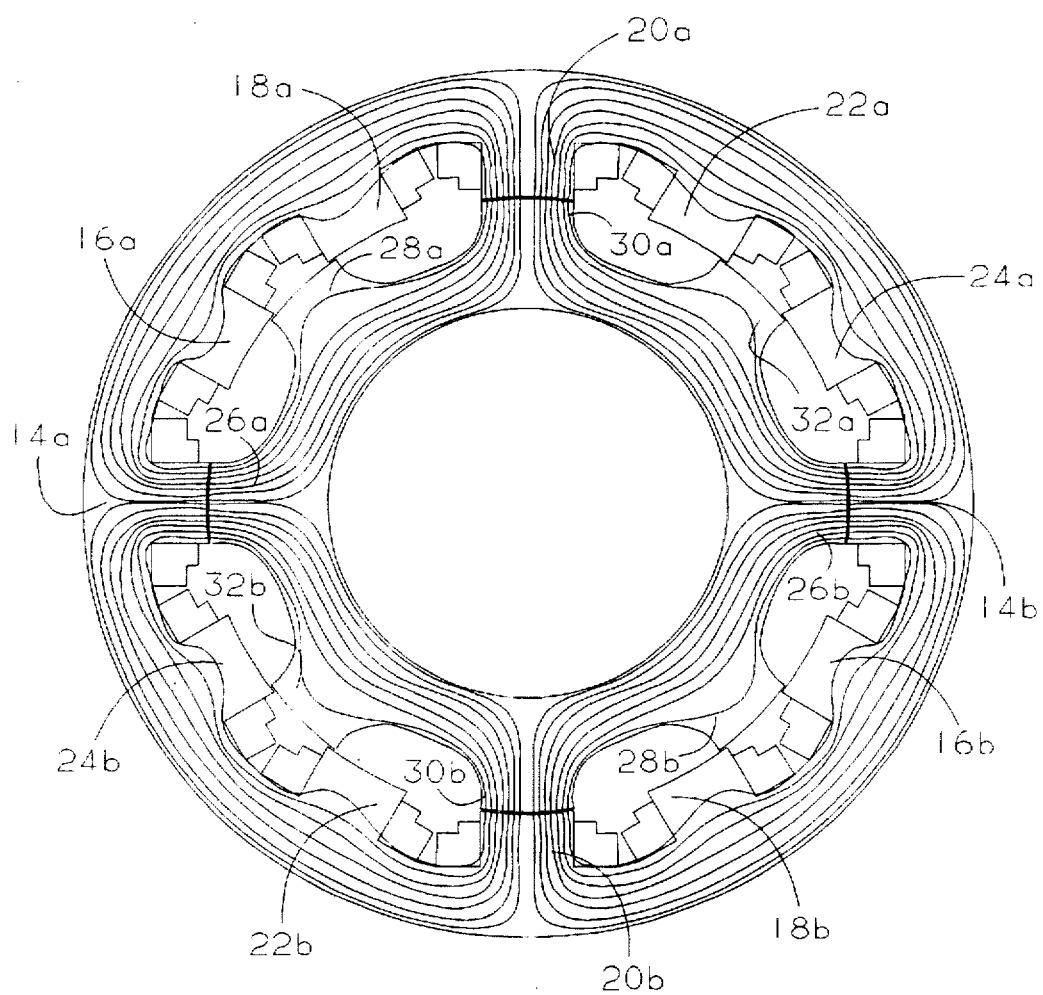
FIG. 3 is a diagrammatic illustration of magnetic flux lines in a SR machine operating under normal conditions, based on a computer simulation.

The SR machine of FIG. 1 includes a stator 10 and a rotor 12. In the illustrative embodiment of FIG. 1, stator 10 has six pairs of stator poles 14a and 14b, 16a and 16b, 18a and 18b, 20a and 20b, 22a and 22b, and 24a and 25b. The two poles of each pair are radially opposite each other. In this illustrative embodiment, rotor 12 has four pairs of rotor poles 26a and 26b, 28a and 28b, 30a and 30b, and 32a and 32b. Again, the two poles of each pair are radially opposite each other. As rotor 12 rotates relative to stator 10, the pairs of rotor poles move into and out of alignment with pairs of stator poles. In FIG. 1, rotor poles 26a and 26b are depicted aligned with stator poles 14a and 14b, while rotor poles 30a and 30b are depicted aligned with stator poles 20a and 20b. On the other hand, rotor poles 28a, 28b, 32a, and 32b are not aligned with stator poles, and stator poles 16a, 16b, 18a, 18b, 22a, 22b, 24a, and 24b, are not aligned with rotor poles.

Each stator pole has a coil wound on it. Thus, stator poles 14a and 14b have coils 34a and 34b respectively wound on them. Likewise, stator poles 16a, 16b, 18a, 18b, 20a, 20b, 22a, 22b, 24a, and 24b respectively have coils 36a, 36b, 38a, 38b, 40a, 40b, 42a, 42b, 44a, and 44b wound on them. The coils on each pair of stator poles are connected in series or in parallel to form a phase winding so that current flows simultaneously through the two coils of the phase winding.

Figure 2:
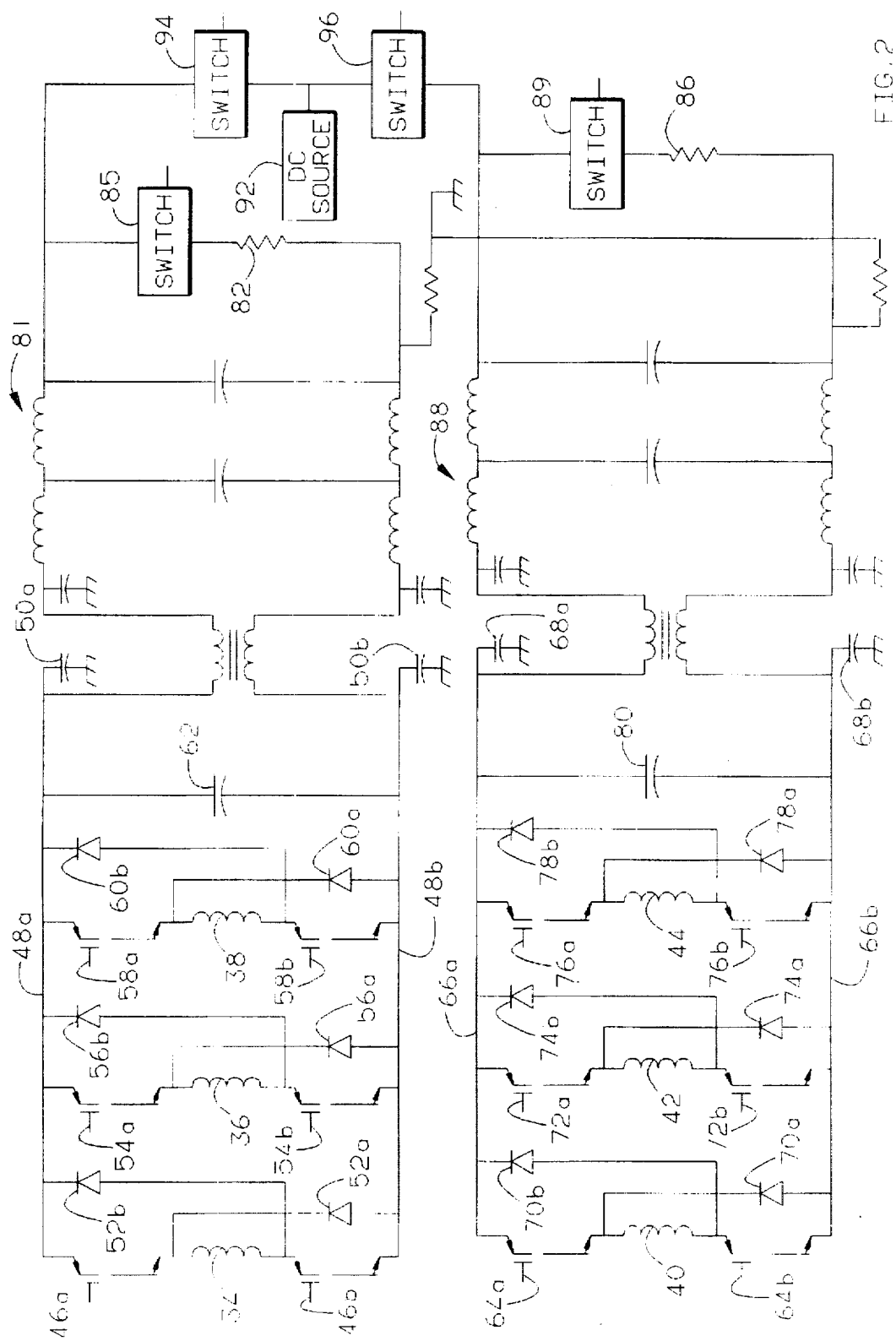
FIG. 2 is a schematic diagram of circuitry of a SR motor/generator electronic circuit and load in accordance with the present invention.
Figure 3:
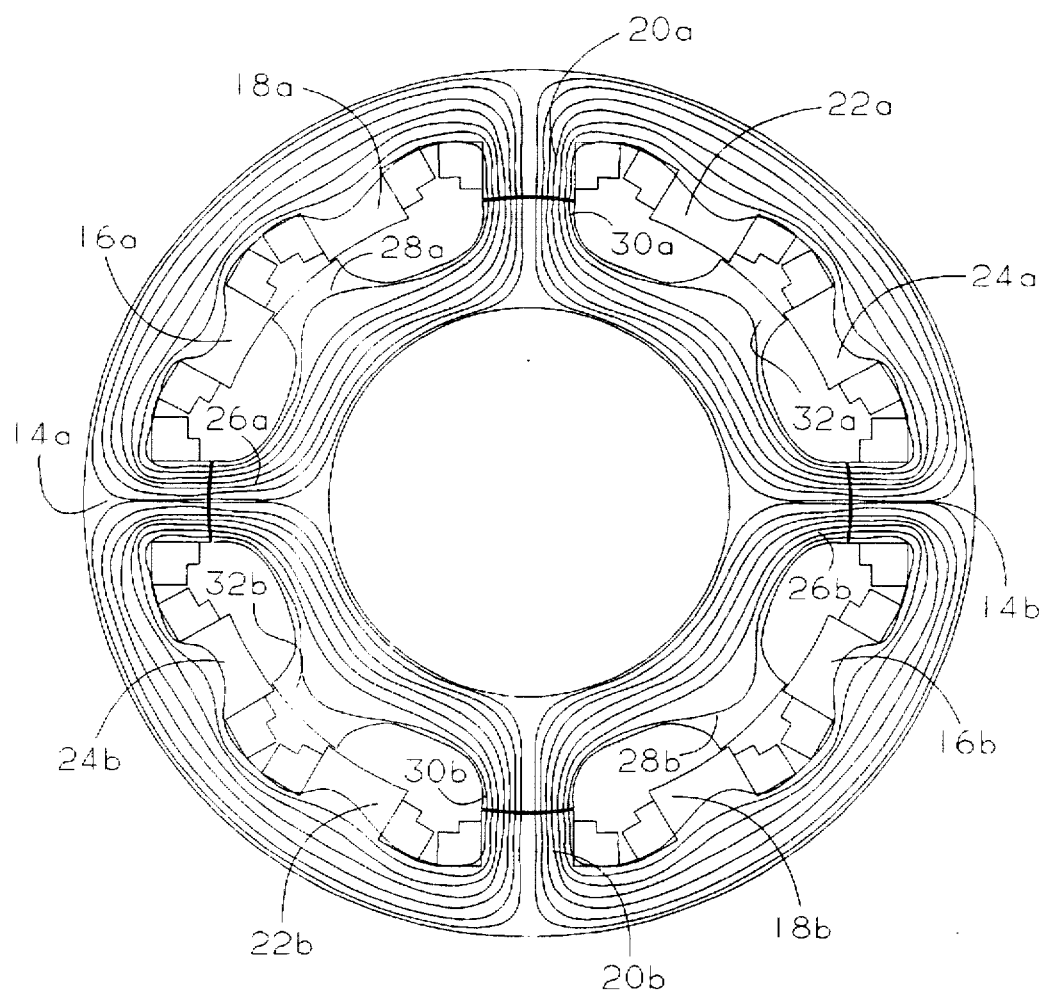

FIG. 2 schematically depicts the circuitry of the SR machine. Coils 34a and 34b, which are wound on the pair of poles 14a, 14b, are depicted in FIG. 2 as phase winding 34. Likewise, the schematic depiction of phase windings 36, 38, 40, 42, and 44 represent the two coils of each such phase winding.

One end of phase winding 34 is coupled by switching transistor 46a to line 48a which in turn is coupled by capacitor 50a to ground. The second end of phase winding 34 is coupled by switching transistor 46b to line 48b which in turn is coupled by capacitor 50b to ground. The junction of phase winding 34 and switching transistor 46a is coupled by diode 52a to line 48b and thus through capacitor 50b to ground, while the junction of phase winding 34 and switching transistor 46b is coupled by diode 52b to line 48a and thus through capacitor 50a to ground.

Similarly, phase winding 36 has its two ends coupled by switching transistors 54a and 54b to lines 48a and 48b respectively and by diodes 56a and 56b to lines 48b and 48a respectively. Likewise, phase winding 38 has its two ends coupled by switching transistors 58a and 58b to lines 48a and 48b respectively and by diodes 60a and 60b to lines 48b and 48a respectively. Capacitor 62 is coupled across lines 48a and 48b.

In like manner, phase winding 40 has its two ends coupled by switching transistors 64a and 64b to lines 66a and 66b respectively. Line 66a is coupled by capacitor 68a to ground, while line 66b is coupled by capacitor 68b to ground. The two ends of phase winding 40 are also coupled by diodes 70b and 70a to lines 66a and 66b, respectively.

Phase winding 42 is similarly coupled by switching transistors 72a and 72b and diodes 74b and 74a to lines 66a and 66b, respectively. Finally, phase winding 44 is similarly coupled by switching transistor 76a and 76b and diode 78b and 78a to lines 66a and 66b, respectively. Capacitor 80 is coupled across lines 66a and 66b.

The several switching transistors 46, 54, 58, 64, 72 and 76 can be any appropriate power switching transistors, such as insulated gate bipolar transistors (IGBT), field effect transistors (FET), or MOS-controlled thyristors (MCT). At present IGBTs are preferred.

Lines 48a and 48b are coupled across load 82 by filter circuit 84, while lines 66a and 66b are coupled across load 86 by filter circuit 88. A D.C. voltage source 92 is connected by switching circuit 94 and filter circuit 84 to line 48a and by switching circuit 96 and filter circuit 88 to line 66a. D.C. source 92 might be a battery or an external D.C. power source.

Returning to FIG. 1, rotor position sensor 97 senses the position of rotor 12 relative to stator 10 and applies position signals to controller and power electronics circuit 98 which also receives on one or more input lines 99 control signals such as torque, speed, or voltage commands. Controller and power electronics circuit 98 has output lines which provide switching signals to switching transistors 46a, 46b, 54a, 54b, 58a, 58b, 64a, 64b, 72a, 72b, 76a, and 76b and to switching circuits 85, 89, 94, and 96 of FIG. 2.

In an electrical power system such as a main power unit or an auxiliary power unit of the type utilized in aircraft, a SR machine is utilized first as a motor, in order to start the prime mover of the power unit, and then as a generator, in order to provide electrical power for various circuits on the aircraft. During startup of the auxiliary power unit, controller and power electronics circuit 98 causes switching circuits 94 and 96 to connect D.C. source 92 to filter circuits 84 and 88, respectively, so that voltage from D.C. source 92 is applied across lines 48a and 48b and across lines 66a and 66b, and causes switching circuits 85 and 89 to isolate loads 82 and 86 from the D.C. source. Phase windings 34–44 then function as motor windings to provide startup of the prime mover. When the prime mover is running, controller and power electronics circuit 98 receives a signal on line 99 which causes switching circuits 94 and 96 to disconnect D.C. source 92 from filter circuits 84 and 89 and causes switching circuits 85 and 89 to connect loads 82 and 86 to the filter circuits. The SR machine is then operated as a generator, with phase windings 34–44 functioning as generator windings to generate a voltage across lines 48a and 48b and across 66a and 66b. This voltage is filtered by circuits 84 and 88 and applied to loads 82 and 86, which might be auxiliary circuitry within an aircraft, for example. During each rotation of rotor 10, the pairs of rotor poles 26a and 26b, 28a and 28b, 30a and 30b, and 32a and 32b move into and out of phase with various ones of the pairs of stator poles. In the SR machine depicted in the drawings, which has four pairs of rotor poles and six pairs of stator poles, two pairs of the rotor poles are aligned at one time with two pairs of the stator poles, and magnetic flux paths exist through the aligned poles. FIG. 3 illustrates a typical set of the magnetic flux paths when rotor poles 26a and 26b are aligned with stator poles 14a and 14b and at the same time rotor poles 30a and 30b are aligned with stator poles 20a and 20b. This is the same alignment configuration depicted in FIG. 1. As can be seen from FIG. 3, considerable magnetic flux exists in the flux paths through the aligned poles.

Should a fault occur in one phase winding of the SR machine, for example, in phase winding 34, controller and power electronics circuit 98 cuts off switching transistors 46a and 46b so that no current can flow through phase winding 34, and the SR machine continues to operate utilizing phase windings 36 through 44.

Figure 4:
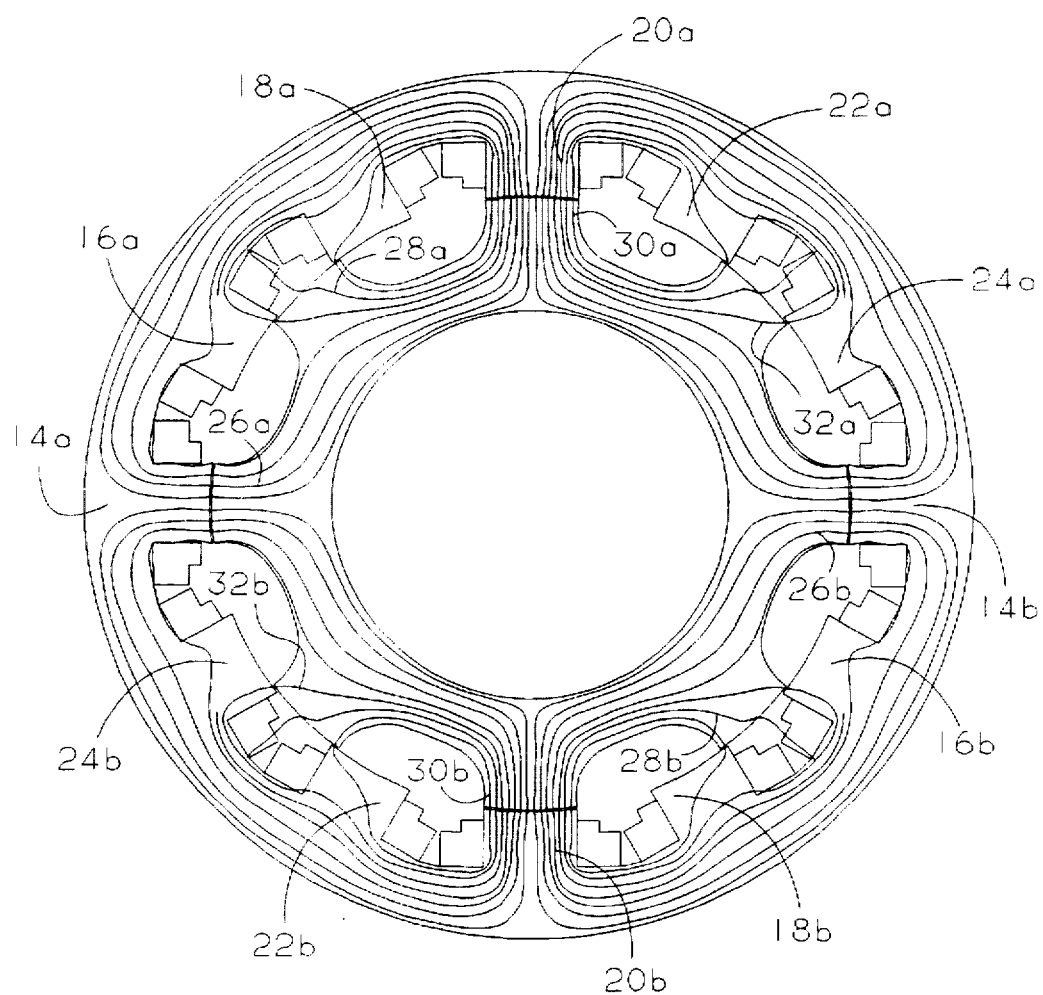
FIG. 4 is a diagrammatic illustration of magnetic flux lines in a prior art SR machine operating under a fault condition, based on a computer simulation.

The above circuitry and operation of a SR machine is well known. However, in a fault condition, when the stator pole having the faulted phase winding is aligned with a rotor pole, a magnetic flux path exists through those aligned poles and through all other stator/rotor poles which are aligned at that same time. If a fault exists in phase winding 34 so that switching transistors 46a and 46b cutoff current through that phase winding, current through phase winding 40 causes magnetic flux in stator poles 20a and 20b. A magnetic flux path still exists through the stator hub, the rotor hub, and the aligned poles 20a, and 30a, 20b and 30b, 14a and 26a, and 14b and 26b. Consequently, even though there is no current in phase winding 34 which is wound on stator poles 14a and 14b, still magnetic flux passes through the aligned poles 14a and 26a and the aligned poles 14b and 26b. FIG. 4 illustrates this magnetic flux. This flux induces a voltage in phase winding 34, resulting in current flow in the faulted phase winding, and as a consequence reduces the average machine output torque, and so presents the potential for a disastrous failure.

In accordance with the present invention, controller and power electronics circuit 98 is operated so that when the stator pole having the faulted phase winding is aligned with a rotor pole, the switching transistors of the phase windings for all the stator poles which at that time are aligned with a rotor pole are cut off to prevent current flow through the phase windings of all the aligned poles. In the above example, if a fault is detected in phase winding 34, controller and power electronics circuit 98 not only cuts off transistors 46a and 46b to stop current flow through coils 34a and 34b, but also cuts off transistors 64a and 64b to stop current flow through coils 40a and 40b. Consequently, the SR machine of FIG. 1 continues to operate with the two phase windings cutoff and the remaining four phase windings operative. Therefore, when stator poles having operative phase windings are aligned with rotor poles, operation is normal with the flux paths of the type depicted in FIG. 3. However, when the stator pole having the faulted phase winding is aligned with a rotor pole, current flow through all phase windings is cut off so that there is no magnetic flux induced in the stator and rotor. This avoids the problems of induced current in the faulted phase winding and so avoids the potentially disastrous effects, as well as avoiding the generation of a torque opposing that of the excited phase windings. It is thus seen that the present invention provides improved and more safe operation of a switched reluctance machine.

Although the invention has been described with reference to a SR machine having twelve stator poles and eight rotor poles, machines of other sizes, for example six stator poles and four rotor poles, could be provided in accordance with the invention. Likewise, although the invention has been described with reference to a SR machine which is a motor/generator of the type utilized in an auxiliary power generator for an aircraft, the invention can be utilized with any SR machine used in any application, whether a SR motor, a SR generator, or a motor/generator. Further, the invention is applicable to other power circuit topologies, in addition to that shown in FIG. 2. Thus, although the present invention has been described with reference to a preferred embodiment, modifications and rearrangements could be made, and still the result would be within the scope of the invention.

We claim:

1. In a switched reluctance machine having a rotor with r poles and a stator with s poles, where r is an integer and s is an integer larger than r, each stator pole having a phase winding wound thereon, means connecting the phase windings of radially opposite ones of said stator poles in circuit, means for sensing the angular position of said rotor, and means responsive to the sensed angular position of said rotor for controlling current through said phase windings, the improvement comprising:

control means responsive to a fault in one of said phase windings for preventing current flow through the phase windings of all stator poles that are aligned with a rotor pole at the time the stator pole having the phase winding with the fault therein is aligned with a rotor pole.

2. A switched reluctance machine comprising:

a rotor having r poles, where r is an integer;

a stator having s poles, each stator pole having a phase winding wound thereon, where s is an integer larger than r so that at s points during each rotation of said rotor relative to said stator, a number of rotor poles less than r is aligned with an equal number of stator poles, while all remaining rotor poles and stator poles are not aligned;

means for sensing the rotational position of said rotor;

means responsive to the sensed rotational position of said rotor for controlling current through said phase windings; and control means responsive to a fault in one of said phase windings for preventing current flow through the phase windings of all stator poles that are aligned with a rotor pole at the time the stator pole having the phase winding with the fault therein is aligned with a rotor pole.

3. A method of operating a switched reluctance machine having a rotor with r poles and a stator with s poles, where r is an integer and s is an integer larger than r, so that at s points during each rotation of said rotor relative to said stator, a number of rotor poles less than r is aligned with an equal number of stator poles, while all remaining rotor poles and stator poles are not aligned, each stator pole having a phase winding wound thereon, means connecting the phase windings of radially opposite ones of said stator poles, means for sensing the angular position of said rotor, and means responsive to the sensed angular position of said rotor for controlling current through said phase windings, said method comprising the steps of:

detecting a fault in one of said phase windings;

in response to detection of the fault, preventing current flow through the phase windings of all stator poles that are aligned with a rotor pole at the time the stator pole having the phase winding with the fault therein is aligned with a rotor pole.

4. A method of operating a switched reluctance machine having a rotor with r poles, a stator with s poles, each stator pole having a phase winding thereon, and means connecting the phase windings of radially opposite ones of said stator poles, where r is an integer and s is an integer larger than r, said method comprising the steps of:

causing said rotor to rotate relative to said stator so that at s points during each rotation of said rotor relative to said stator, a number of rotor poles less than r is aligned with an equal number of stator poles, while all remaining rotor poles and stator poles are not aligned;

sensing the angular position of said rotor;

controlling current through said phase windings in accordance with the sensed angular position of said rotor;

detecting a fault in one of said phase windings; and preventing current flow through the phase windings of all stator poles that are aligned with a rotor pole at the time the stator pole having the phase winding with the fault therein is aligned with a rotor pole.

* * * * *